United States Patent [19]

Blood

[11] Patent Number: 5,197,585
[45] Date of Patent: Mar. 30, 1993

[54] OBJECT SORTING APPARATUS WITH OBJECT HOLDER FACILITATING LATERAL TRANSFER

[75] Inventor: Roger Blood, Linden, Va.

[73] Assignee: Agri-Tech Incorporated, Woodstock, Va.

[21] Appl. No.: 846,235

[22] Filed: Mar. 6, 1992

[51] Int. Cl.⁵ .......................................... B65G 17/32
[52] U.S. Cl. ................................... 198/384; 209/538; 198/534; 198/803.14
[58] Field of Search .................. 198/534, 803.14, 384, 198/799; 209/912, 538

[56] References Cited

U.S. PATENT DOCUMENTS

| | | | |
|---|---|---|---|
| 2,822,010 | 2/1958 | Harden et al. | 198/803.14 X |
| 2,909,270 | 10/1959 | Hait | 198/384 |
| 3,075,629 | 1/1963 | Gibbs | 198/384 |
| 3,187,892 | 6/1965 | Whitmore et al. | 209/538 X |
| 3,206,022 | 9/1965 | Roberts, Jr. et al. | 209/912 X |
| 3,575,292 | 4/1971 | Roda | 209/912 X |
| 3,580,381 | 5/1971 | Kilner | 198/384 |
| 3,962,701 | 6/1976 | Paddock et al. | 198/803.14 X |
| 4,005,774 | 2/1977 | Casanova Valero | 198/384 |
| 4,353,455 | 10/1982 | Mumma et al. | 198/384 |
| 4,482,061 | 11/1984 | Leverett | 198/384 X |
| 4,585,126 | 4/1986 | Paddock et al. | 198/803.14 X |
| 4,830,195 | 5/1989 | DeGreef | 209/912 X |
| 4,836,355 | 6/1989 | Blanc | 198/534 X |
| 4,981,205 | 1/1991 | Cowlin | 198/384 X |

Primary Examiner—D. Glenn Dayoan
Attorney, Agent, or Firm—Foley & Lardner

[57] ABSTRACT

An object sorting apparatus has a singulation section, a sorting section, and a transfer section for transitioning objects, such as fruit, to be sorted to a conveyor which drops the objects into appropriate collection bins. Objects for sorting are transported on an endless conveyor or wheels through the singulation and sorting section. A first independently adjustable speed belt in the singulation section rotates in a direction opposite that of the flow of items from the singulation section to the sorter section, to assist in singulation. A second adjustable speed belt rotates in the same direction as the wheels and operates to provide a view of each of four sides of the object to an imaging device. The imaging device supplies signals representing a desired sorting parameter to a processor which evaluate the measured parameters and generates signals so that the objects are ultimately deposited in appropriate sorting bins. An object holder receives an object as it is about to be dropped onto a second conveyor for transport to the collection bins. The object holder, which is pivotally attached to the wheels, acts to extend the lateral distance of the object beyond the return location of the endless conveyor. This reduces the vertical distance the object must fall before it is captured by a transport cup on the second conveyor, thus reducing damage to the objects, such as bruising of fruit. A rotatable transfer roll is positioned between the conveyors to restrict vertical travel and impart lateral motion to the objects as they leave the object holder. The transfer is preferably padded to further reduce the risk of bruising the fruit.

14 Claims, 5 Drawing Sheets

OBJECT SORTING APPARATUS WITH OBJECT HOLDER FACILITATING LATERAL TRANSFER

BACKGROUND OF THE INVENTION

1. Field of the Invention

The invention is related to an apparatus and method for sorting objects, in particular fruit, and for transferring such objects between conveyors without damage.

2. Related Art

Object sorting apparatus, in particular fruit sorters, typically have an intake area which receives quantities of fruit. In order to sort the fruit by quality or grade, for example by size, color, or other characteristics, it is necessary to singulate the fruit so that individual pieces can be inspected. Upon inspection, each piece of fruit can be graded according to size, weight, color, or other desired parameter, and then transferred to a conveyor so that the fruit can be deposited in appropriate collecting bins. Copending U.S. application Ser. No. 07/686,336 to Low, incorporated herein by reference, discloses a soft drop singulating device in which fruit is transferred with minimal bruising. Copending U.S. application Ser. No. 07/513,271 to Coffelt et al. discloses a sonic fruit sizer which orients fruit in a specified direction for presentation to ultrasonic waves, so that reflections can be measured to determine the size of each piece of fruit. Items are then sorted by size, with different size items collected in different collecting bins.

The above references fail to address the problem of mechanically induced damage to fruit as it passes from a sorter to a conveyor for depositing the fruit into appropriate grading collection bins. Moreover, the references lack a description of a method for rotating fruit to obtain images of the various aspects of the fruit, including all sides of the fruit, for sorting purposes, for example by size or color.

SUMMARY AND OBJECTS OF THE INVENTION

In view of the above limitations of the related art, it is an object of the invention to provide a sorting apparatus which sorts based on evaluating images of an entire surface of the fruit;

It is still a further object of the invention to rotate the fruit to present all sides of the fruit to an image acquiring apparatus, such as a camera or a sonic measuring device;

It is still another object of the invention to mechanically transfer fruit from a sorting device to a conveyor with minimal mechanical impact on the fruit;

The above and other objects of the invention are achieved by a fruit or other object sorting system having a singulation section of sufficient length to singulate the fruit or other objects, a viewing or sorting section in which the fruit or other object is rotated so that all sides are exposed to an image acquisition device, such as a camera, a transfer section in which the fruit or other object is deposited into a cup shaped holder pivotally attached to a conveyor in the viewing or sorting section, such that the cup shaped holder releases the fruit or other object in mid-air at a lateral location extending above a padded transfer roll and a second conveyor, which captures the object and deposits it in an appropriate bin based on the results of the sort.

BRIEF DESCRIPTION OF THE DRAWINGS

The above objects of the invention are accomplished by the apparatus and method described below with reference to the drawings in which.

DETAILED DESCRIPTION OF THE PREFERRED EMBODIMENTS

An object sorter according to the invention has a singulation section with a first object conveyor having independently rotating wheels pivotally attached to and transporting a proximate portion of an object holder through the singulation section of the apparatus. The object holder has a distal end positioned between a first pair of the wheels, a proximate portion positioned between a second pair of the wheels and a cup shaped portion between the distal and proximate ends. The wheels are located a lateral distance across from each other so that objects placed in the singulation section contact the wheels without dropping into the object holder. A first independently adjustable speed belt contacts the first object conveyor wheels to rotate the wheels at a substantially constant speed in the singulation section. This causes singulation of the objects contacting the wheels.

Figure 3A:
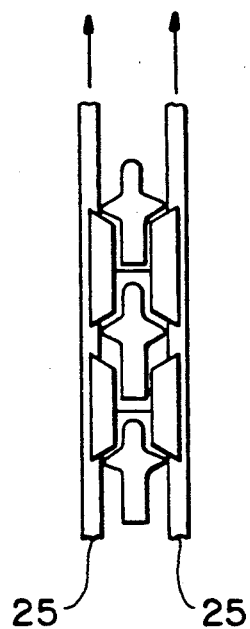
FIG. 3a is a top view of a configuration using separate belts for each row of wheels.
Figure 3B:
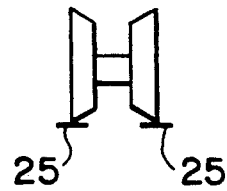
FIG. 3b is an end view of a configuration using separate belts for each row of wheels.
Figure 4:
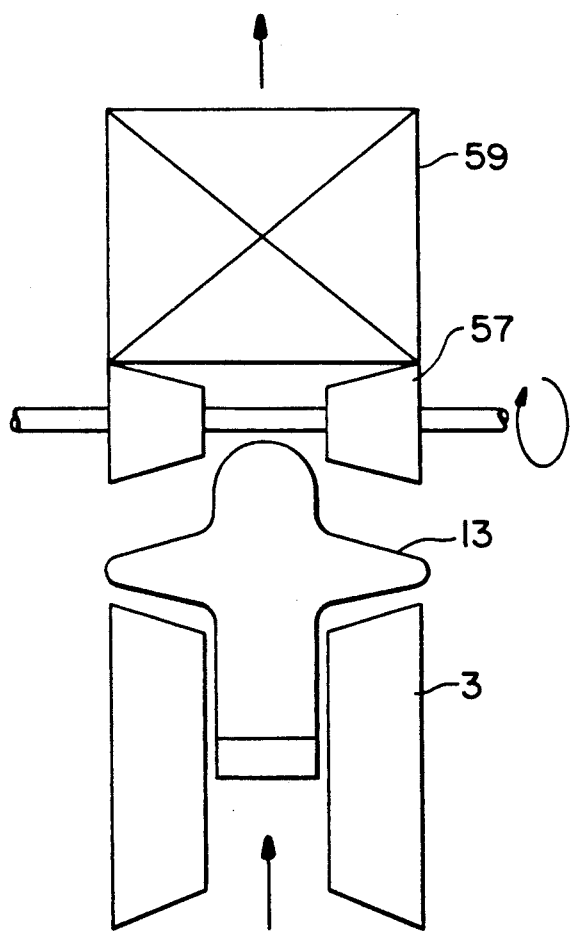
FIG. 4 illustrates the position of the transfer roll used in the invention.

FIGS. 3a and 3b illustrate a preferred configuration which employs separate belts, 25, 25 for each row of wheels. By using separate belts for each row of wheels, it is possible to run the belts at either the same speed to achieve rotation or at different speeds to rotate the fruit about different axes simultaneously.

A sorting section has wheels receiving objects from the singulation section. The sorting section determines a measurement parameter for each object received and sorts the objects according to the measurement parameter. A second independently adjustable speed belt contacts the wheels in the color sorting section to drive them at a rate to cause a complete, progressive rotation of each fruit item contacting the wheels as it passes through the sorting section. As previously noted, it is possible to employ separate belts for each row of wheels, as shown in FIGS. 3a and 3b, to obtain rotation of the fruit about more than one axis in the sorter section also.

A composite measurement parameter, e.g., size or color, is determined for each individual item after the measurement parameter has been obtained for each of a plurality of views. The composite measurement parameter is compared to a reference, e.g., color or size in predetermined measurement units, on which different values represent different grades for sorting purposes.

In a preferred embodiment, the camera is synchronously activated to obtain images of several pieces of fruit in each of one or more lanes simultaneously. Several views of each piece of fruit are obtained. Synchronous operation allows a processor associated with the sorter to route parametric signals and to a memory and correlate calculated values with individual pieces of fruit.

Upon exiting the sorting section, the individual items of fruit enter a transfer section where the distal end of the cup portion of the object holder is transported in a lateral direction beyond a last pair of wheels at a return location of the conveyor conveying the items through the color sorting section. As the item transitions off the last pair of wheels, it is lowered into the cup shaped portion of the object holder. The item or object to be sorted is released from the cup portion onto a transfer roll 75, preferably padded, and into a second conveyor as the proximate end of the object pivots at the return location. The transfer roll spins forward. This minimizes the downward distance and direction of the fruit, cushions its fall and translates the fruit's direction into a more horizontal direction. The transfer roll also acts to increase fruit speed.

Figure 5:
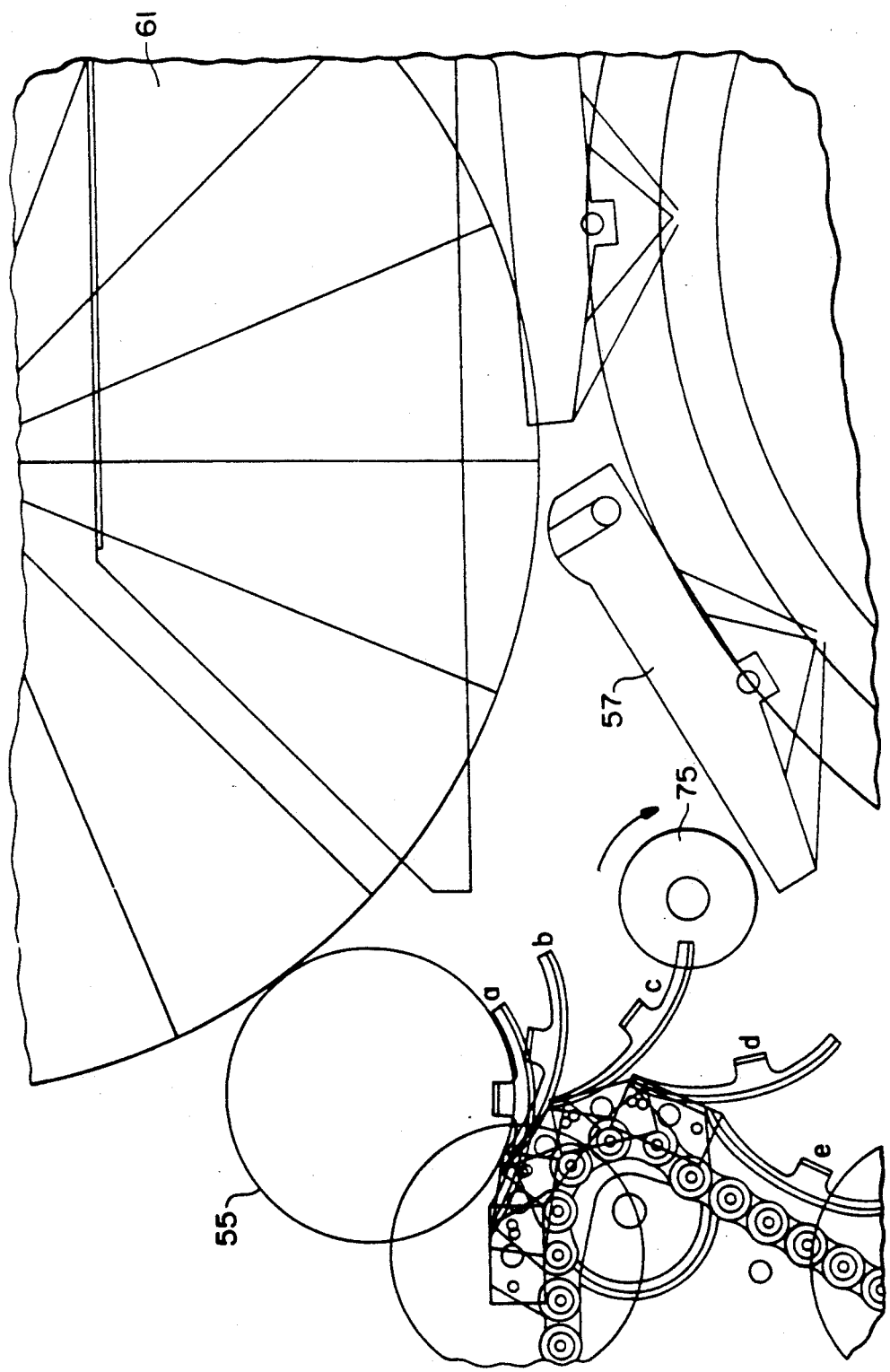
FIG. 5 is a view showing the action of the transfer roll.

The last wheels at the return location of the conveyor produce a lateral force on the object as it transitions into the cup shaped holder. As the cup shaped holder pivots downward, the fruit or object contacts the transfer roll 75 which cushions the fall of the object and deflects the object towards the second conveyor 57. A holding cup on a second conveyor 57 moves generally upward to snatch the fruit in mid-air as it is deflected off from the transfer roll 75 before it has an opportunity to fall any substantially vertical distance. This reduces the force on the fruit and helps prevent bruising or other damage. A brush can be located laterally of and vertically above the first conveyor return location to contact the object as it transitions off the first conveyer and provide additional force to project the object in the lateral direction. The transfer roll 75 acts with the brush to help maintain control of the fruit during transfer. Since both are rotating in the desired direction of fruit movement, they act together to make the transfer much more consistent. The relative position of the transfer roll 75 is illustrated in FIG. 5.

Figure 1:
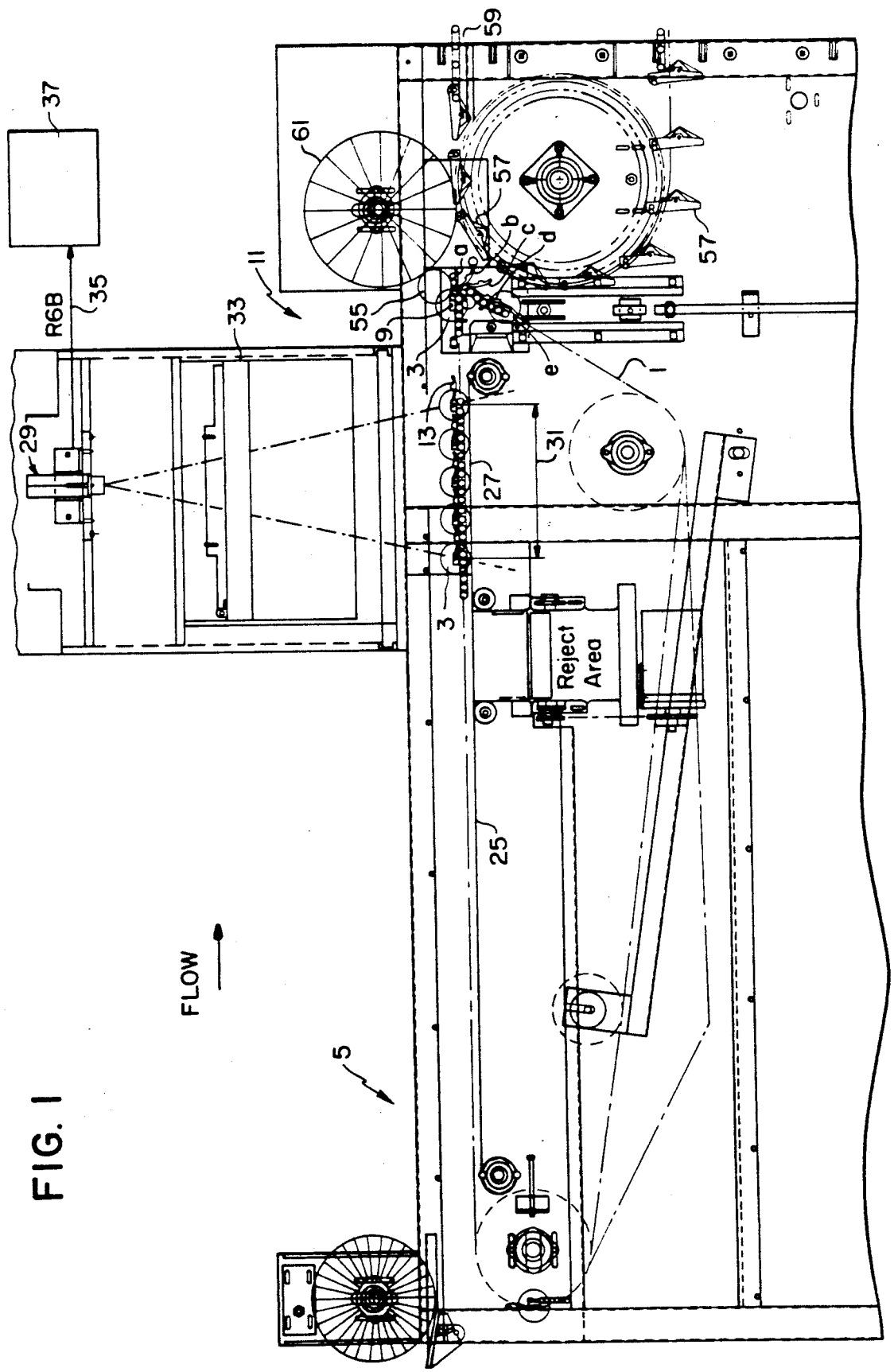
FIG. 1 is a side view of a sorting apparatus according to the invention.

FIG. 1 is a side view of a sorting apparatus according to the invention. As shown in FIG. 1, a single chain conveyor 1 drives wheels 3 in a forward lateral direction through singulation section 5 and sorting section 7, to return location 9 at transfer section 11. Although a single chain conveyor is shown, it would be possible to use a separate chain conveyor in the singulation and sorting sections.

Figure 2:
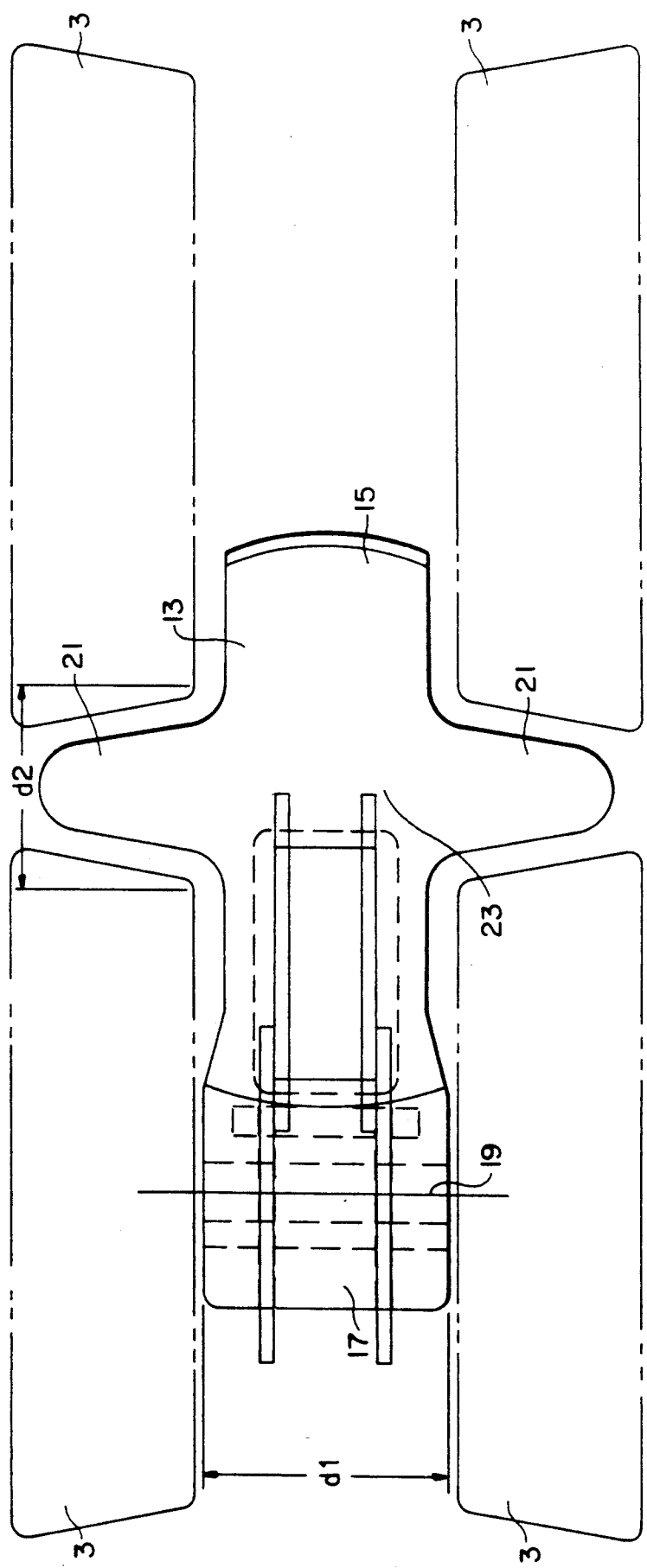
FIG. 2 is a top view of an object holder according to the invention.

As shown in FIG. 2, an object holder 13 is positioned between two pairs of wheels 3. The object holder has a distal end 15 and a proximate end 17. Proximate end 17 has a pivotal connection 19 to one pair of the wheels 3. Object holder 13 also has fingers 21 forming a central portion 23 of the object holder which is generally cut shaped. Wheels 3 are of resilient material to avoid damaging objects deposited on them. In addition, wheels 3 and object holder 13 are generally colored light blue to avoid interfering with color sorting in sorting section 7. Wheels 3 are positioned lateral distances d1 and d2 apart, as shown in the top view of FIG. 2. Distances d1 and d2 are selected so that the wheels are sufficiently close that the items to be sorted do not fall into the object holder 13.

Singulation section 5 has first belts 25. Sorting section 7 has a second belts 27. As previously discussed and illustrated in FIG. 3a and 3b, in a preferred embodiment, separate belts are provided for each row of wheels. Belts 25 and 27 operate at independently adjustable speeds. Belts 25 in the singulation section rotates in a reverse lateral direction, which is opposite the direction of rotation of wheels 3. The purpose of drive belts 25 is to assist in singulation. The belt speed can be selected so that there is virtually no turning of the wheels in the singulation section. This condition might be appropriate for sorting fruit such as pears. The independent speed adjustment of the belts can be configured in any known manner.

Sorting section 7 has an image acquisition device 29, such as a camera, synchronized to acquire an image over field of view 31 at specified times. For illustration purposes only, and not by way of limitation, the description herein is discussed in terms of a single lane of fruit to be sorted. However, it will be clear to those of ordinary skill that multiple lanes of fruit can sorted and transferred in the same way. All such configurations are within the scope of the invention herein.

In the sorting section, each piece of fruit is rotated to present all its several views to the image acquisition device 29 as the fruit passes through singulation section 7. This is accomplished by rotating belts 27 in the same lateral direction as the travel of the fruit and the rotation of the wheels 3. If left to run without belts 27, wheels 3 would naturally overrotate in the sorting section 7. Thus, the use of belts 27 to control the rotation of wheels 3 tends to slow their rotation. The speed of belts 27 can be adjusted to accommodate the size of the fruit to achieve any desired image presentation to the image acquisition device 29. For smaller fruit, it may be necessary to slow the wheel speed to prevent overturning. On the other hand, larger fruit might require an increase in the speed of wheel rotation. Belts 27 can be adjusted to achieve the desired effect.

Upon completion of the sorting process, the fruit must be transferred to a second conveyor in order to be deposited into individual bins, according to grade. As a piece of fruit 55 approaches return location 9 of drive chain 1, the first pair of wheels on which the fruit sits turns in a downward vertical direction causing the fruit to be deposited into generally cup shaped section 23 of object holder 13. Until the second pair of wheels at which object holder 13 is pivotally connected begins to turn vertically in the downward direction, the distal end 15 of object holder 13 holds the fruit in a lateral position which is past return location 9. FIGS. 1 and 5 illustrate positions a–e of object holder 13 as it passes return location 9. As object holder 13 moves from position a to position c, the fruit 55 transitions across transfer roll 75 to a transport cup 57 for delivery by conveyor 59 to appropriate collection bins. Conveyer 59 receives bin drop activation signals causing cups 57 to deposit the fruit in the appropriate collection bins (not shown). As the fruit transitions from object holder 13 across transfer roll 75, which preferably is padded, to transport cup 57, the rear pair of wheels on which the fruit had been riding exerts a lateral force on the fruit pushing it laterally across transfer roll 75 toward the collection cup 57. Optionally, circular brush 61 rotating in a counter clockwise direction also acts to provide a lateral force on fruit 55 across transfer roll 75 toward cup 57. As a result, fruit 55 transitions from the sorting and singulation section which typically operates laterally at 96.25 feet per minute to the second conveyor 59 which operates a higher speed in a lateral direction, up to 165 feet per minute. As a result of the lateral extension of the fruit toward cup 57 by object holder 13, an item of fruit 55 need move through a shorter vertical distance before it is captured by transport cup 57. This reduces bruising and overall enhances the marketability of the fruit.

In operation fruit or other objects to be sorted are loaded into singulation section where they are singulated with the assistance of first independently adjustable speed belts 25. The objects remain on top of the resilient wheels 3 and are transported through the singulation section 5 to sorter section 7. In sorter section 7, each object is approximately rotated 360° with the forwardly moving wheels with the help of second rotating belts 27. A reference is used to trigger the shutter of image acquisition device 29 to provide synchronous operation. In one embodiment each passage of transport cup 57 past a known point corresponding to a time when a desired number of pieces of fruit are in the image field is detected and the image acquisition device is triggered at that time. An event trigger is useful for maintaining proper synchronous operation at any speed. Any event which accurately predicts when the desired objects will be in the image field can be used as a reference.

Several images of each object can be obtained to improve sorting by rotating the object. Appropriate signals are then generated to deposit the objects or fruit in the correct collection bins.

The fruit is then transferred from the sorter to transport cups on a second conveyor. As discussed above, at a return location the fruit is gradually transitioned from the object holder across a transfer roll to a generally upwardly moving transport cup before it falls a long vertical distance.

While specific embodiments of the invention have been described and illustrated, it will be clear that variations in the details of the embodiments specifically illustrated and described may be made without departing from the true spirit and scope of the invention as defined in the appended claims.

What is claimed is:

1. An apparatus for transferring objects between conveyors, said apparatus comprising:
    a first endless conveyor having a finger shaped object holder, said object holder having an extended distal end, a central cup shaped portion to hold a said object and a proximate end with a pivoting attachment to a conveying mechanism, said distal end of each said object holder extending a lateral distance beyond a first conveyor when said object holder is transported to a return point where said first endless conveyor returns on itself, until said pivoting attachment of said finger shaped object holder travels laterally to about said first conveyor return point;
    a second conveyor having a receiving holder positioned laterally of said first conveyor return point to receive a said object from said first conveyor as said object transitions off said first conveyor when said finger shaped object holder pivots at said first conveyor return point; and
    a transfer roll positioned between the first and second conveyors, said transfer roll receiving objects from said finger-shaped object holder and transferring said objects to said receiving holder.

2. The apparatus recited in claim 1, wherein said conveying mechanism comprises a wheel located at said first conveyor return point, said wheel being positioned to contact said object as said object transitions off said first conveyor to project said object in a lateral direction.

3. The apparatus recited in claim 1, further comprising a brush located laterally of and vertically above said first conveyor return point, said brush contacting said object as said object transitions off said first conveyor to project said object in a lateral direction.

4. An apparatus for transferring objects from a first endless conveyor to a second conveyor, said apparatus comprising a finger shaped object holder having an elongated distal end, a cup shaped central portion to hold a said object and a proximate end with a pivoting attachment to a conveying mechanism of said first conveyor, said distal end of each said finger shaped object holder extending a lateral distance beyond a first conveyor return point where said first endless conveyor returns on itself, until said pivoting attachment of said finger shaped object holder travels laterally to about said first conveyor return point where said finger shaped object holder pivots and said object transitions off said first conveyor to a holder on said second conveyor.

5. The apparatus recited in claim 4, wherein said conveying mechanism comprises a wheel located at said first conveyor return point, said wheel being positioned to contact said object as said object transitions off said first conveyor to project said object in a lateral direction.

6. The apparatus recited in claim 4, further comprising a brush located laterally of and vertically above said first conveyor return point, said brush contacting said object as said object transitions off said first conveyor to project said object in a lateral direction.

7. An object sorting apparatus comprising:
    a singulation section having a first object conveyor with independently rotating wheels pivotally attached to, and transporting, a proximate portion of an object holder through said singulation section of said apparatus, said object holder having a distal end positioned between a first pair of said wheels, said proximate portion positioned between a second pair of said wheels and a cup shaped portion between said distal and proximate ends, the wheels of said pairs being located a lateral distance across from each other so that objects placed in said singulation section contact said wheels without dropping into a said object holder;
    a first independently adjustable speed belt contacting said first object conveyor wheels to rotate said wheels at a substantially constant speed in said singulation section, thereby causing singulation of objects contacting said wheels in said singulation section;
    a second independently adjustable speed belt contacting said wheels to drive said wheels in a sorting section of said apparatus at a rate causing a complete, progressive rotation of an object contacting said wheels when passing through said sorting section;
    a transfer section where said distal end and said cup shaped portion of said object holder is transported in a lateral direction beyond a last pair of wheels at a return location of said conveyor, thereby causing an object exiting said sorting section to be lowered into said cup shaped portion, and wherein said object is released from said cup shaped portion into a second conveyor when said proximate end pivots at said return location; and
    a transfer roll between said first and second conveyors, said transfer roll receiving said objects from said object holder and transferring said objects to said second conveyor.

8. The apparatus recited in claim 7, wherein said last pair of wheels at said return location pushes a said object in said cup portion out in a lateral direction out of said cup portion when said proximate end pivots at said return location.

9. The apparatus recited in claim 7, further comprising a brush located laterally of and vertically above said return location, said brush contacting said object as said object transitions out of said cup portion to project said object in a lateral direction.

10. The apparatus recited in claim 7 wherein said first conveyor rotates said wheels in a forward direction away from said singulation section toward said sorting section and said first belt travels in an opposite direction of wheel travel to assist in singulation.

11. The apparatus recited in claim 7, wherein said wheels in said sorting section rotate in a forward direction away from said sorting section toward said transfer section, and said second belt rotates said wheel in the same direction.

12. The apparatus recited in claim 7, further comprising a plurality of releases opening in response to signals from said sorting section to place objects in collection bins.

13. The apparatus recited in claim 1, wherein said transfer roll is rotatable.

14. The apparatus recited in claim 7, wherein said transfer roll is rotatable.

* * * * *